(12) United States Patent
Goto (10) Patent No.: US 8,299,434 B2
(45) Date of Patent: Oct. 30, 2012

(54) LIGHT DETECTING DEVICE

(75) Inventor: Koichi Goto, Kariya (JP)

(73) Assignee: Denso Corporation, Kariya (JP)

( * ) Notice: Subject to any disclaimer, the term of this patent is extended or adjusted under 35 U.S.C. 154(b) by 326 days.

(21) Appl. No.: 12/829,471

(22) Filed: Jul. 2, 2010

(65) Prior Publication Data

US 2011/0001977 A1 Jan. 6, 2011

(30) Foreign Application Priority Data

Jul. 6, 2009 (JP) ................................ 2009-159534

(51) Int. Cl.
*G01J 5/00* (2006.01)

(52) U.S. Cl. .................................................. 250/338.1

(58) Field of Classification Search .... 250/338.1–338.5, 250/340, 227.25, 573–574, 216; 356/436
See application file for complete search history.

(56) References Cited

U.S. PATENT DOCUMENTS

| 4,636,643 | A | * | 1/1987 | Nakamura et al. | ......... 250/338.1 |
| 5,111,037 | A |   | 5/1992 | Boderie et al. | |
| 6,376,824 | B1 |   | 4/2002 | Michenfelder et al. | |
| 6,906,467 | B2 | * | 6/2005 | Stam et al. | ....................... 315/82 |
| 7,235,786 | B2 | * | 6/2007 | Bayha et al. | ............. 250/339.11 |
| 2008/0068143 | A1 | * | 3/2008 | Sugiura | ....................... 340/425.5 |
| 2009/0152449 | A1 |   | 6/2009 | Goto | |

FOREIGN PATENT DOCUMENTS

| EP | 577501 A1 | * | 1/1994 |
| JP | A-58-183156 |   | 10/1983 |
| JP | 09-181339 |   | 7/1997 |
| JP | 2004-037093 |   | 2/2004 |
| JP | 2005-031016 |   | 2/2005 |
| JP | 2007-242949 |   | 9/2007 |

OTHER PUBLICATIONS

Japanese Office Action dated Dec. 6, 2011, issued in corresponding Japanese Application No. 2009-159534 with English Translation.
Chinese Office Action dated Mar. 1, 2012, issued in corresponding Chinese Application No. 201010224930.7 with English Translation.
Japanese Office Action Apr. 27, 2011, issued in corresponding Japanese Application No. 2009-159534 with English Translation.
Chinese Office Action dated Aug. 17, 2011, issued in corresponding Chinese Application No. 201010224930.7 with English Translation.

* cited by examiner

*Primary Examiner* — Kiho Kim (74) *Attorney, Agent, or Firm* — Nixon & Vanderhye PC (57) ABSTRACT

A light detecting device includes a case, a light introducing member and a light receiving element. A predetermined light is incident into an inlet face of the introducing member, and an outlet face of the introducing member emits the light incident into the inlet face. A first distance is defined between a top point of the outlet face and a focus of the introducing member, and a second distance is defined between the top point of the outlet face and a light receiving face of the receiving element. The outlet face has a convex lens shape in a manner that the first distance is smaller than the second distance.

13 Claims, 4 Drawing Sheets

LIGHT DETECTING DEVICE

CROSS REFERENCE TO RELATED APPLICATION

This application is based on Japanese Patent Application No. 2009-159534 filed on Jul. 6, 2009, the disclosure of which is incorporated herein by reference in its entirety.

BACKGROUND OF THE INVENTION

1. Field of the Invention

The present invention relates to a light detecting device.

2. Description of Related Art

JP-A-2002-500769 discloses a light detecting device having a light introducing member and a light receiving element. A headlight of a vehicle is controlled based on an intensity of light detected by the light detecting device. The light introducing member introduces a predetermined light passing through a windshield of the vehicle. The light receiving element receives light emitted from the light introducing member. A light emitting face of the light introducing member has a convex lens shape. A light receiving face of the light receiving element is arranged at a position corresponding to a light-collecting spot of a focus of the light introducing member.

An angle of the windshield relative to the vehicle is different among kinds of the vehicle. Due to the difference in the angle of the windshield, the light receiving face of the light receiving element and the focus of the light introducing member may have a position deviation. In this case, the predetermined light may not be detected by the light receiving element. Therefore, it is necessary to adjust the position of the light receiving element or the focus of the light introducing member relative to each kind of the vehicle.

JP-A-2005-31016 discloses a light detecting device. A light emitting face of a light introducing member of the light detecting device is processed, such that a curvature radius of the light emitting face is partially changed. Thus, a light-collecting spot of a focus of the light introducing member can have a large diameter. In this case, even if a position deviation is generated between the light receiving element and the focus of the light introducing member, the predetermined light can be detected by the light receiving element.

However, highly precise processing is required for the light detecting device of JP-A-2005-31016. Moreover, there is a limit for increasing a size of the light-collecting spot by changing the curvature radius of the light emitting face. Therefore, if the angle of the windshield has a large variation among the kinds of the vehicle, a position deviation may be generated between the light-collecting spot and the light receiving face. In this case, the predetermined light may not be detected by the light receiving element.

SUMMARY OF THE INVENTION

In view of the foregoing and other problems, it is an object of the present invention to provide a light detecting device.

According to a first example of the present invention, a light detecting device to detect light traveling around a vehicle includes a case, a first light introducing member and a first light receiving element. The case has an opening, and is mounted to a windshield of the vehicle. A predetermined light passes through the windshield and the opening. The first light introducing member located adjacent to the opening has an inlet face and an outlet face. The predetermined light is incident into the inlet face, and the outlet face emits the light incident into the inlet face. The first light receiving element is arranged in the case so as to receive the light emitted from the outlet face. The first light receiving element outputs a signal corresponding to an intensity of the light received by the first light receiving element. The outlet face has a convex lens shape so as to define a first distance between a top point of the outlet face and a focus of the first light introducing member, and a second distance between the top point of the outlet face and a light receiving face of the first light receiving element. The first distance is smaller than the second distance.

Accordingly, the light detecting device can be easily and accurately mounted to the windshield without a position adjustment.

According to a second example of the present invention, a light detecting device to detect light traveling around a vehicle includes a case, a first light introducing member and a first light receiving element. The case has an opening, and is mounted to a windshield of the vehicle. A predetermined light passes through the windshield and the opening. The first light introducing member located adjacent the opening has an inlet face and an outlet face. The predetermined light is incident into the inlet face, and the outlet face emits the light incident into the inlet face. The first light receiving element is arranged in the case so as to receive the light emitted from the outlet face. The first light receiving element outputs a signal corresponding to an intensity of the light received by the first light receiving element. The inlet face has a first dimension in a predetermined direction. The light emitted from the outlet face has a second dimension in the predetermined direction when the light emitted from the outlet face reaches a light receiving face of the first light receiving element. The outlet face has a concave lens shape in a manner that the second dimension is larger than the first dimension.

Accordingly, the light detecting device can be easily and accurately mounted to the windshield without a position adjustment.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT (First Embodiment)

Figure 1:
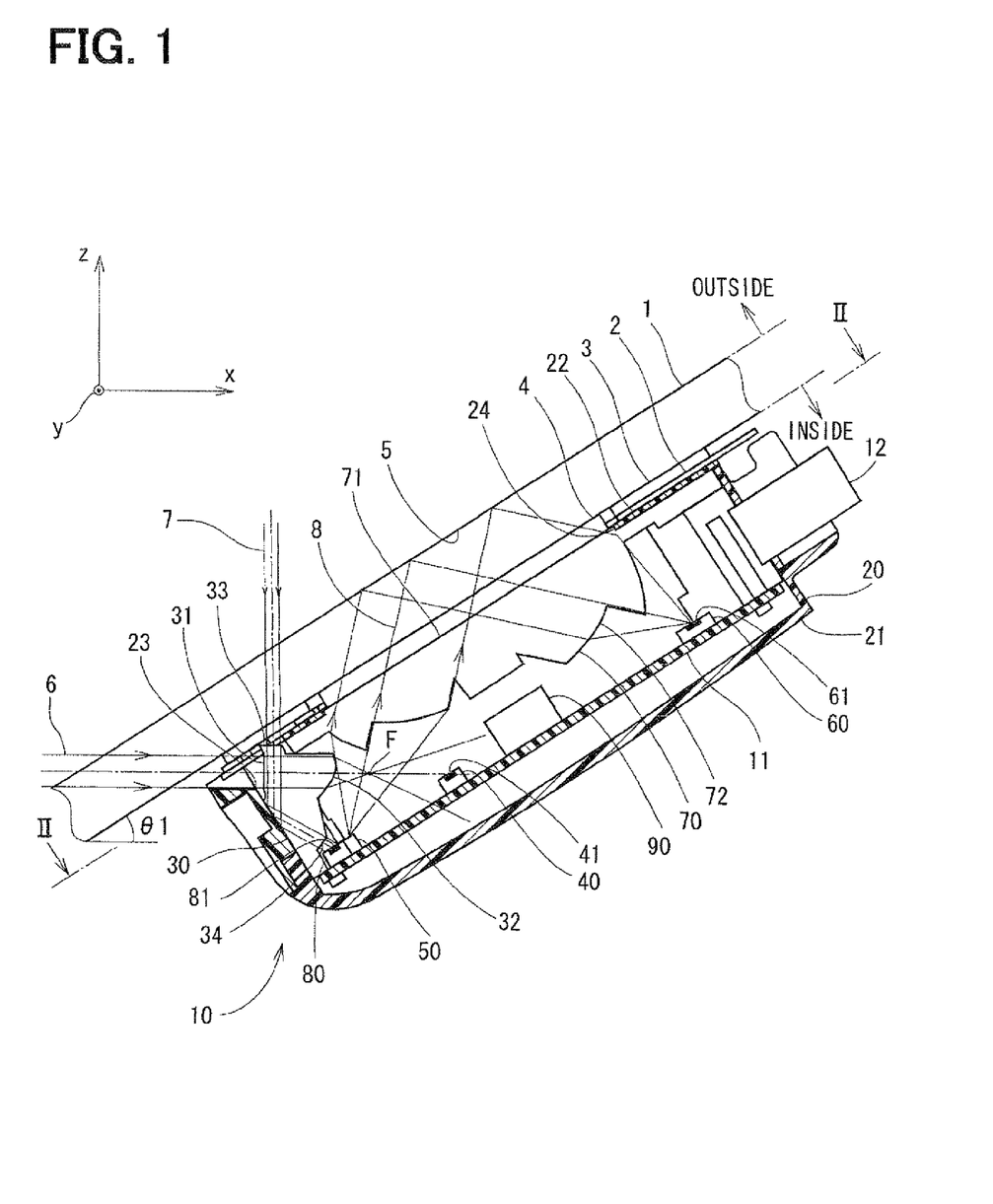
FIG. 1 is a cross-sectional view illustrating a light detecting device according to a first embodiment.

As shown in FIG. 1, a light detecting device 10 of a first embodiment is mounted to a windshield 1 of a vehicle. The windshield 1 is made of glass, and is located on a front side of the vehicle in a vehicle traveling direction. The device 10 is located in a wiping area of the windshield 1, and is positioned at an upper end portion of the windshield 1 without interrupting a driver visibility.

As shown in FIG. 1, the device 10 has a case 20, a first light introducing member 30, a first light receiving element 40, a light emitting element 50, a second light receiving element 60 and a second light introducing member 70. The device 10 detects light traveling around the vehicle, and is used for controlling a headlight of the vehicle.

The case 20 has an approximately rectangular shape, and is made of a light shielding material such as resin. The case 20 has a main portion 21 and a board-shaped lid portion 22. The main portion 21 has a based box shape, and the lid portion 22 covers an end face of the main portion 21 opposite from a base of the main portion 21. A bracket 2 is mounted on the lid portion 22 of the case 20. The case 20 is attached to the windshield 1 through the bracket 2 by using adhesive 3. The case 20 is located inside of a passenger compartment of the vehicle.

As shown in FIG. 1, a xyz-space is defined by x-axis, y-axis and z-axis. The x-axis represents a front-and-rear direction of the vehicle. The y-axis represents a left-and-right direction of the vehicle. The z-axis represents an up-and-down direction of the vehicle. That is, xy-plane is parallel with the ground on which the vehicle travels. The z-axis corresponds to a vertical direction.

The case 20 has an opening 23 located between the main portion 21 and the lid portion 22. The windshield 1 has an inclined angle θ1 relative to the x-axis. When the device 10 is mounted to the windshield 1, light passes through the windshield 1 and the opening 23. That is, light is able to be incident into the case 20.

The first light introducing member 30 is arranged in the case 20, and is located adjacent to the opening 23. The first light introducing member 30 is made of transparent resin or glass, for example. The first light introducing member 30 has an inlet face 31 and an outlet face 32. The inlet face 31 is located in the opening 23.

A predetermined light 6 passing through the windshield 1 is incident into the inlet face 31. The light 6 travels in a predetermined direction extending from a front side of the vehicle toward the vehicle. That is, the light 6 comes from the front side of the vehicle, and has a direction corresponding to the x-axis. The light 6 may correspond to a forward light. The light 6 incident into the inlet face 31 passes through the first light introducing member 30, and is emitted from the outlet face 32.

The first light introducing member 30 has another inlet face 33 and another outlet face 34 other than the inlet face 31 and the outlet face 32. A light 7 coming from an upper side of the vehicle passes through the windshield 1, and is incident into the inlet face 33. The light 7 travels from the upper side of the vehicle toward the vehicle. The light 7 has a direction corresponding to the z-axis. The light 7 incident into the inlet face 33 performs a total reflection at a border plane between inside and outside of the first light introducing member 30. Thus, a route of the light 7 is changed. The light 7 reflected by the border plane of the first light introducing member 30 is emitted from the outlet face 34.

A substrate 11 is arranged in the case 20. The first light receiving element 40, the light emitting element 50 and the second light receiving element 60 are disposed on the substrate 11. The first light receiving element 40 is made of a photo-diode or a photo-transistor. The first light receiving element 40 is located at a position able to receive the light 6 emitted from the outlet face 32 of the first light introducing member 30. A position relationship between the first light receiving element 40 and the outlet face 32 is to be specifically described below.

The first light receiving element 40 outputs a signal corresponding to an intensity of the light 6 received by a light receiving face 41 of the first light receiving element 40. The signal output from the first light receiving element 40 corresponds to an intensity of visible light. The signal output from the first light receiving element 40 is sent to a signal amplifier (not shown) arranged on the substrate 11, and is amplified by the signal amplifier. The amplified signal is transmitted to a control device (not shown) through a calculating circuit element (not shown) arranged on the substrate 11 and a connector 12, as an intensity signal of the light 6.

A third light receiving element 80 made of a photo-diode or a photo-transistor is disposed on the substrate 11. The third light receiving element 80 is located at a position able to receive the light 7 emitted from the outlet face 34 of the first light introducing member 30. The third light receiving element 80 outputs a signal corresponding to an intensity of the light 7 received by a light receiving face 81 of the third light receiving element 80. The signal output from the third light receiving element 80 corresponds to an intensity of visible light, similarly to the first light receiving element 40. The signal output from the third light receiving element 80 is transmitted to the control device through the calculating circuit element and the connector 12, as an intensity signal of the light 7.

The control device controls the headlight of the vehicle based on the intensity signal of the light 6 transmitted from the first light receiving element 40, and the intensity signal of the light 7 transmitted from the third light receiving element 80.

Figure 2:
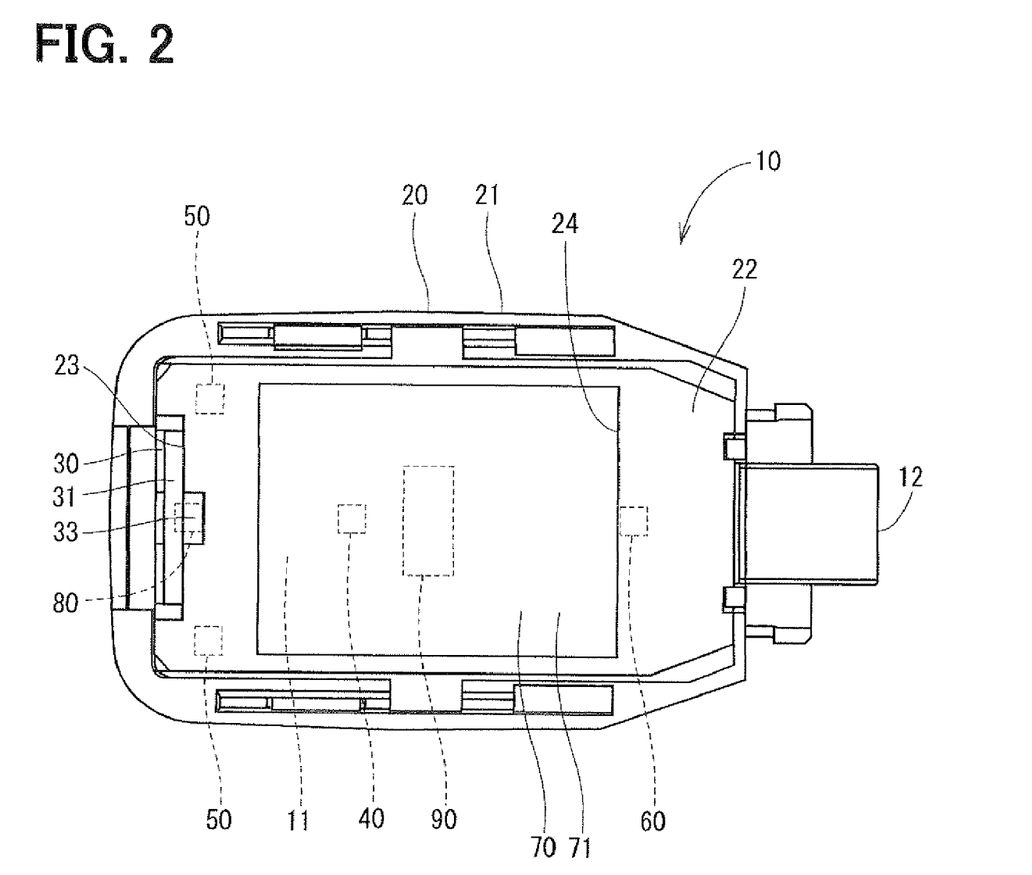
FIG. 2 is a plan view illustrating the light detecting device seen in an arrow direction II of FIG. 1.

As shown in FIG. 2, two of the light emitting elements 50 are arranged on the substrate 11, and the third light receiving element 80 is located between the light emitting elements 50. The light emitting element 50 is able to radiate infrared light, for example.

The lid portion 22 of the case 20 has an approximately rectangular opening 24 at a center section. The second light introducing member 70 is arranged on the lid portion 22 in a manner that a face 71 of the second light introducing member 70 is exposed from the opening 24.

When the device 10 is mounted to the windshield 1, a transparent board-shaped elastic member 4 is arranged between the second light introducing member 70 and the windshield 1. At this time, the elastic member 4 is contact with the second light introducing member 70 and the windshield 1. Further, the second light introducing member 70 is located between the first light receiving element 40 and the windshield 1, when the device 10 is attached to the windshield 1.

The second light introducing member 70 is made of transparent resin or glass, for example. The second light introducing member 70 is colored to be able to shield light having a wave length in a predetermined range. The second light introducing member 70 is colored to shield visible light, for example. In contrast, infrared light can pass through the second light introducing member 70.

As shown in FIG. 2, the second light receiving element 60 is arranged on the substrate 11, and has the same distance from two of the light emitting elements 50. The second light receiving element 60 outputs a signal corresponding to an intensity of light received by a light receiving face 61 of the second light receiving element 60. The signal output from the second light receiving element 60 corresponds to an intensity of infrared light.

As shown in FIG. 1, when the light emitting element 50 irradiates infrared light 8, the infrared light 8 is emitted from a first face 71 of the second light introducing member 70 after passing through a second face 72 of the second light introducing member 70.

The infrared light 8 emitted from the first face 71 of the second light introducing member 70 passes through the elastic member 4, and is reflected by a border plane 5 defined between the windshield 1 and an outside of the vehicle. The reflected infrared light 8 again passes through the elastic member 4, and is emitted from the second face 72 of the second light introducing member 70 after passing through the first face 71 of the second light introducing member 70.

The light receiving face 61 of the second light receiving element 60 receives the infrared light 8 emitted from the second face 72 of the second light introducing member 70. The second light receiving element 60 outputs a signal corresponding to an intensity of the infrared light 8 received by the light receiving face 61. The signal output from the second light receiving element 60 is sent to the calculating circuit element arranged on the substrate 11.

The light emitting element 50, the second light receiving element 60, and the calculating circuit element may correspond to a raindrop detector. The second face 72 of the second light introducing member 70 has a lens shape. Therefore, the infrared light 8 irradiated from the light emitting element 50 can efficiently perform the total reflection on the border plane 5. Further, the infrared light 8 reflected by the border plane 5 effectively reaches the second light receiving element 60.

The first light introducing member 30 and the second light introducing member 70 are separated from each other. Therefore, the route of the light 6 passing through the first light introducing member 30 can be physically made different from the route of the infrared light 8 passing through the second light introducing member 70, when the infrared light 8 is irradiated from the light emitting element 50 and is reflected by the border plane 5.

An operation of the raindrop detector will be described.

If a raindrop adheres onto the outside of the windshield 1, the intensity of the infrared light 8 reflected by the border plane 5 is lowered. That is, the signal output from the second light receiving element 60 is varied. The calculating circuit element to which the signal is transmitted from the second light receiving element 60 can detect an amount of the raindrop based on the variation of the signal. A signal representing the amount of the detected raindrop is transmitted to the control device through the connector 12. The control device controls a wiper mode based on the signal transmitted from the raindrop detector.

Figure 3A:
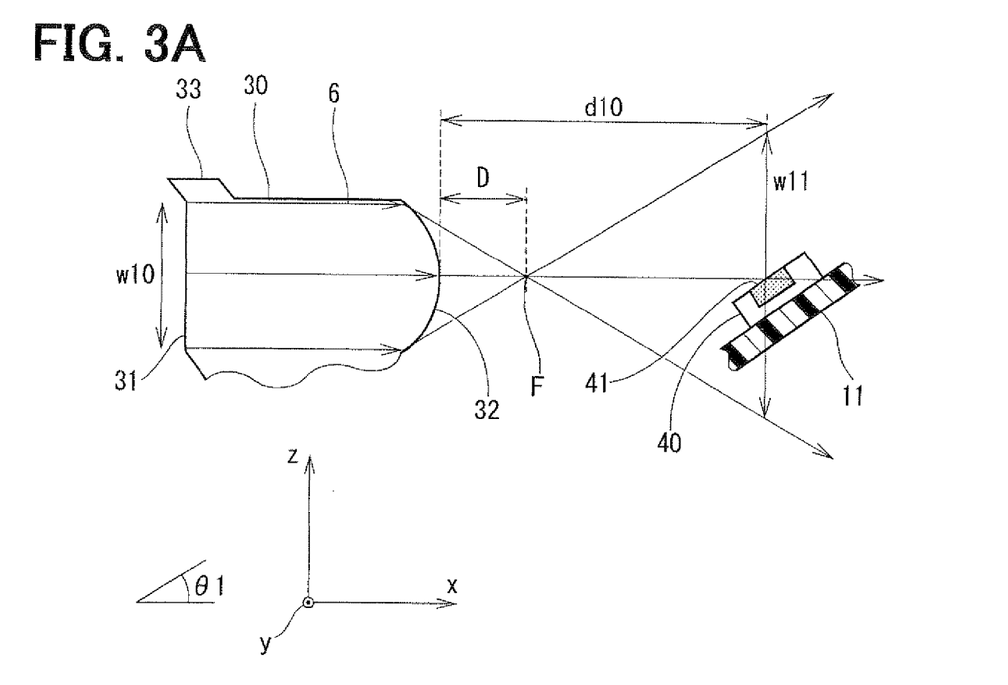
FIG. 3A is a view illustrating the light detecting device mounted to a windshield having an angle of $\theta 1$.

The position relationship between the first light receiving element 40 and the outlet face 32 of the first light introducing member 30 will be described with reference to FIGS. 3A and 3B. FIG. 3A shows the first light receiving element 40 and a part of the first light introducing member 30, when the device 10 is mounted to the windshield 1 having the angle θ1. The outlet face 32 of the first light introducing member 30 has a convex lens shape.

A focus distance D between a top point of the outlet face 32 and a focus F of the first light introducing member 30 is shorter than a distance d10 between the top point of the outlet face 32 and the light receiving face 41 of the first light receiving element 40.

Moreover, the outlet face 32 has a shape in a manner that a width w11 of light emitted from the outlet face 32 and located at a position corresponding to the light receiving face 41 is larger than a width w10 of the inlet face 31. The width w10, w11 is defined to extend in a predetermined direction. The predetermined direction is parallel to both of the inlet face 31 of the first light introducing member 30 and the xz-plane, when the device 10 is attached to the windshield 1.

After the light 6 passing through the windshield 1 is incident into the inlet face 31, the light 6 is emitted from the outlet face 32, and is focused at the focus F. The focused light 6 is diffused, and arrives at the light receiving face 41 of the first light receiving element 40. The width w11 of the diffused light located at the light receiving face 41 is larger than the width w10 of the inlet face 31. Therefore, the width w11 of the light 6 in the predetermined direction at the position of the light receiving face 41 is sufficiently larger than a size of the light receiving face 41.

Another case will be described, where the device 10 is attached to the windshield 1 having the angle θ2. FIG. 3B shows the first light receiving element 40 and a part of the first light introducing member 30, when the device 10 is mounted to the windshield 1 having the angle θ2. The angle θ2 of FIG. 3B is larger than the angle θ1 of FIG. 3A.

A width w12 of the light 6 emitted from the outlet face 32 in the predetermined direction is smaller than the width w11 of FIG. 3A, when the light 6 reaches the light receiving face 41. However, the width w12 is larger than the width w10 of the inlet face 31. Moreover, the light receiving face 41 of the first light receiving element 40 is located inside of an area of the diffused light 6 after passing through the focus F.

Figure 3B:
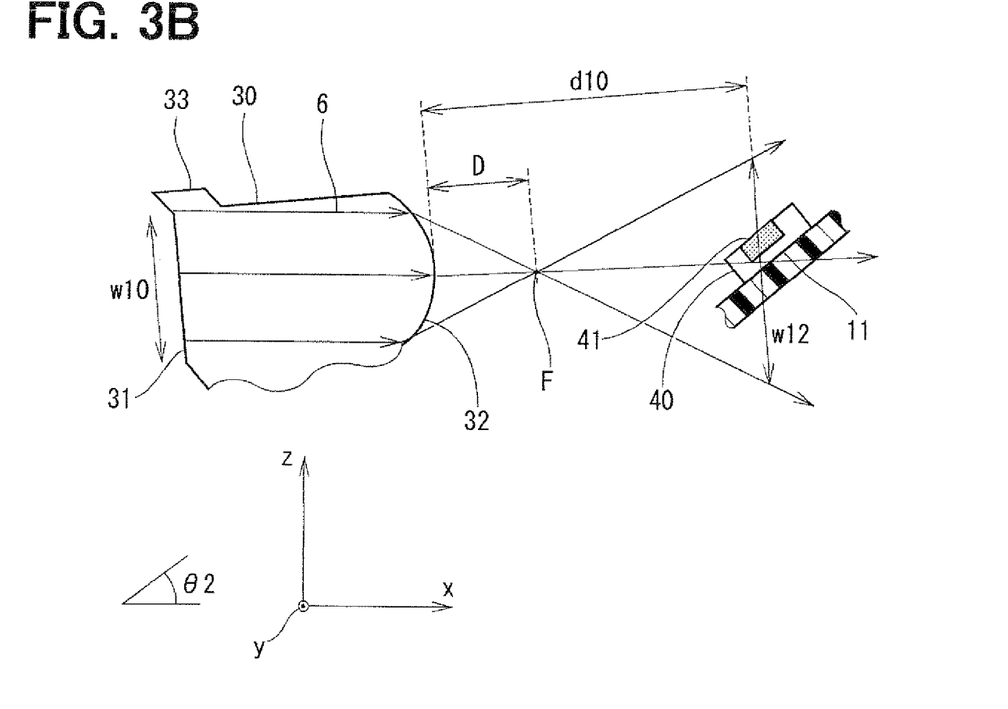
FIG. 3B is a view illustrating the light detecting device mounted to a windshield having an angle of $\theta 2$.

As shown in FIGS. 3A and 3B, when the angle θ1, θ2 of the windshield 1 is in a predetermined range, the first light receiving element 40 is able to receive the light 6 emitted from the outlet face 32. The predetermined range is defined in a manner that the first light receiving element 40 is able to receive the light 6 emitted from the outlet face 32.

As shown in FIG. 1, the first light receiving element 40 arranged on the substrate 11 is located between the light emitting element 50 and the second light receiving element 60. A capacitor 90 is further disposed on the substrate 11, and is located between the first light receiving element 40 and the second light receiving element 60. The capacitor 90 is an electronic component to remove noise of current supplied to the first light receiving element 40, the second light receiving element 60, the third light receiving element 80, and light emitting element 50. The capacitor 90 has a size able to shield the light 6 emitted from the outlet face 32 of the first light introducing member 30. Therefore, the capacitor 90 can prevent the light 6 from reaching the second light receiving element 60. That is, the capacitor 90 may correspond to a shielding member.

The outlet face 32 of the first light introducing member 30 has the convex lens shape, in a manner that the focus distance D between the top point of the outlet face 32 and the focus F of the first light introducing member 30 is shorter than the distance d10 between the top point of the outlet face 32 and the light receiving face 41 of the first light receiving element 40. Therefore, the width w11 of the light 6 emitted from the outlet face 32 at the position of the light receiving face 41 can be made larger than the size of the light receiving face 41 of the first light receiving element 40. If an angle of the windshield 1 is changed within the predetermined range, the light 6 can be received by the light receiving face 41 of the first light receiving element 40.

When the device 10 is attached to windshields having angles different from each other, the light 6 can be received by the light receiving face 41 of the first light receiving element 40 without adjusting the position of the first light receiving element 40 or the position of the focus F of the first light introducing member 30. That is, the device 10 can be attached to the windshields having angles different from each other without adjusting the position of the first light receiving element 40. Moreover, it is not necessary to process the outlet face 32 of the first light introducing member 30 with high precision, such that the device 10 can be easily produced at a low cost.

The outlet face 32 of the first light introducing member 30 has a shape in a manner that the width w11, w12 of light 6 emitted from the outlet face 32 in the predetermined direction at the position of the light receiving face 41 is larger than the width w10 of the inlet face 31 in the predetermined direction. Therefore, the width w11, w12 of the light 6 can be made enough larger than the size of the light receiving face 41 without enlarging the size of the first light introducing member 30. Even if an angle of the windshield 1 has a large variation in the predetermined range, the light 6 can be received by the light receiving face 41 of the first light receiving element 40.

Therefore, the device 10 can be attached to the windshields having angles different from each other without adjusting the position of the first light receiving element 40. Further, the size of the device 10 can be made smaller by making the size of the first light introducing member 30 smaller. Furthermore, because the inlet face 31 of the first light introducing member 30 can be made small, the inlet face 31 of the first light introducing member 30 cannot be easily seen from outside. Thus, an appearance of the device 10 can be made better.

Moreover, the device 10 further includes the raindrop detector constructed by the light emitting element 50 and the second light receiving element 60, and the second light introducing member 70. Therefore, the device 10 can detect the light 6, and can detect an amount of raindrop adhering on the windshield 1.

The first light introducing member 30 and the second light introducing member 70 are separated from each other. Therefore, the route of the light 6 passing through the first light introducing member 30 can be made not to cross the route of the infrared light 8 passing through the second light introducing member 70 in the member 30, 70, when the infrared light 8 is irradiated from the light emitting element 50 and is reflected by the border plane 5. That is, the route of the light 6 passing through the first light introducing member 30 can be physically made different from the route of the infrared light 8 passing through the second light introducing member 70.

Accordingly, the light irradiated from the light emitting element 50 can be restricted from reaching the first light receiving element 40 via the second light introducing member 70 or the first light introducing member 30. That is, the signal output from the first light receiving element 40 is not affected by the raindrop detector, such that the light 6 can be accurately detected.

The second light introducing member 70 is located between the first light receiving element 40 and the windshield 1. The second light introducing member 70 is colored so as to shield the visible light. Therefore, visible light contained in light traveling around the vehicle can be interrupted by the second light introducing member 70, while the first light receiving element 40 detects visible light. Therefore, the visible light can be restricted from reaching the first light receiving element 40 via the second light introducing member 70. Thus, the first light receiving element 40 can accurately detect the light 6 without being affected by light passing through the windshield 1 and the second light introducing member 70.

The light emitting element 50 radiates infrared light 8, and the light 8 irradiated from the light emitting element 50 can pass through the second light introducing member 70. Further, the second light receiving element 60 detects infrared light. Therefore, the raindrop detector constructed by the light emitting element 50 and second light receiving element 60 can be effectively facilitated.

The first light receiving element 40 is located between the light emitting element 50 and the second light receiving element 60. The device 10 further has the shielding portion corresponding to the capacitor 90 located between the first light receiving element 40 and the second light receiving element 60. The capacitor 90 is able to shield the light 6 emitted from the outlet face 32 of the first light introducing member 30. Therefore, the capacitor 90 can prevent the light 6 from reaching the second light receiving element 60. Thus, the light 6 can be accurately detected by the first light receiving element 40, and the amount of raindrop adhering to the windshield 1 can be accurately detected by the second light receiving element 60.

The device 10 further includes the substrate 11 on which the first light receiving element 40, the light emitting element 50 and the second light receiving element 60 are arranged. The device 10 further includes at least one electronic components corresponding to the capacitor 90 arranged on the substrate 11. Because the capacitor 90 arranged on the substrate 11 also operates as the shielding portion, it is not necessary to arrange a shielding portion other than the capacitor 90. Therefore, the size of the device 10 can be made smaller, and a manufacturing cost of the device 10 can be reduced.

(Second Embodiment)

Figure 4A:
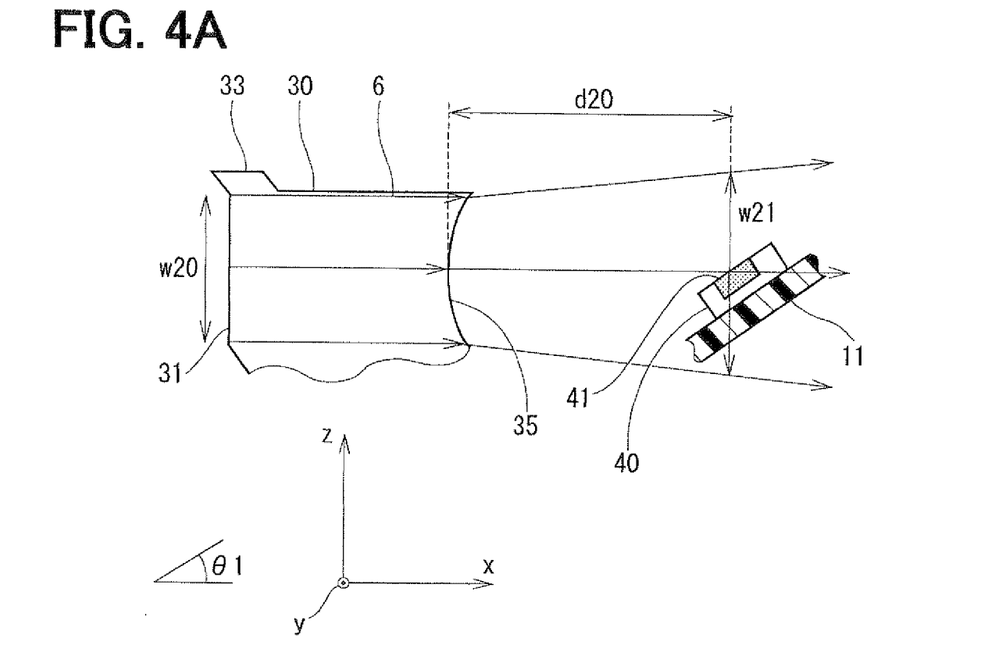
FIG. 4A is a view illustrating a light detecting device according to a second embodiment, the device being mounted to a windshield having an angle of $\theta 1$.

An outlet face 35 of a first light introducing member 30 of a second embodiment has a shape different from that of the outlet face 32 of the first light introducing member 30 of the first embodiment. FIG. 4A shows a first light receiving element 40 and a part of the first light introducing member 30, when a light detecting device 10 of the second embodiment is mounted to a windshield 1 having an angle θ1.

The outlet face 35 of the first light introducing member 30 has a concave lens shape, and a width w21 of light 6 emitted from the outlet face 35 is larger than a width w20 of the inlet face 31 in a predetermined direction, when the light 6 is located at a position corresponding to a light receiving face 41. The first light receiving element 40 is located at a position distanced from the outlet face 35 of the first light introducing member 30 by a predetermined distance d20.

After the light 6 passing through the windshield 1 is incident into the inlet face 31, the incident light is emitted from the outlet face 35, and the emitted light is diffused. The diffused light reaches the light receiving face 41 of the first light receiving element 40. The width w21 of the light reaching the light receiving face 41 is set larger than the width w20 of the inlet face 31 in the predetermine direction. Therefore, the width w21 of the light 6 at the position of the light receiving face 41 is sufficiently larger than a size of the light receiving face 41 without increasing a size of the first light introducing member 30.

Figure 4B:
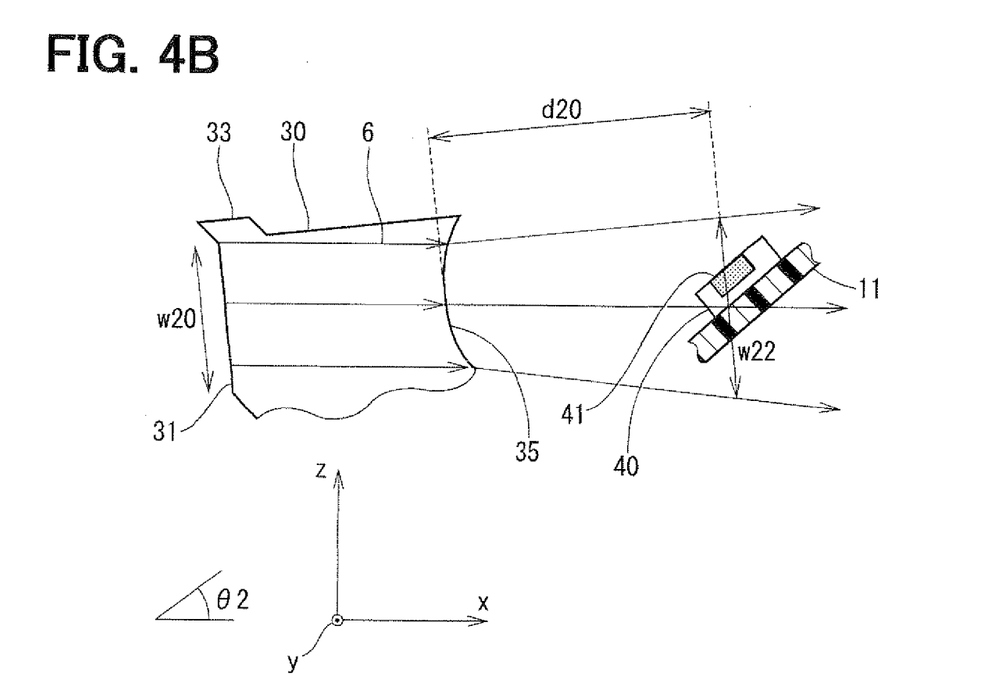
FIG. 4B is a view illustrating the light detecting device mounted to a windshield having an angle of $\theta 2$.

Another case will be described, where the device 10 is attached to a windshield 1 having an angle θ2. FIG. 4B shows the first light receiving element 40 and a part of the first light introducing member 30, when the device 10 is mounted to the windshield 1 having the angle θ2 larger than the angle θ1 of FIG. 4A.

A width w22 of the light 6 emitted from the outlet face 35 is smaller than the width w21 of FIG. 4A in the predetermined direction, when the light 6 is located at the position corresponding to the light receiving face 41. However, the width w22 is larger than the width w20 of the inlet face 31. Moreover, the light receiving face 41 of the first light receiving element 40 is located in an area of diffused light, after the light 6 is emitted from the outlet face 35.

As shown in FIGS. 4A and 4B, when the angle θ1, θ2 of the windshield 1 is in a predetermined range, the first light receiving element 40 can receive the light 6 emitted from the outlet face 35. The predetermined range is defined in a manner that the first light receiving element 40 is able to receive the light 6 emitted from the outlet face 35.

The outlet face 35 of the first light introducing member 30 has the concave lens shape, and the width w21, w22 of light 6 located at the position of the light emitting face 41 is larger than the width w20 of the inlet face 31 in the predetermined direction. Therefore, the width w21, w22 of the light 6 can be made enough larger than the size of the light receiving face 41 without enlarging the size of the first light introducing member 30. Even if an angle of the windshield 1 has a large variation in the predetermined range, the light 6 can be received by the light receiving face 41 of the first light receiving element 40.

The light 6 can be received by the light receiving face 41 of the first light receiving element 40 without adjusting the position of the first light receiving element 40, even when the windshields have angles different from each other. Therefore, the device 10 can be attached to the windshields having different angles without adjusting the position of the first light receiving element 40. Further, the size of the device 10 can be made smaller by making the size of the first light introducing member 30 smaller. Furthermore, because the inlet face 31 can be made small, the inlet face 31 cannot be easily seen from outside. Thus, an appearance of the device 10 can be made better. Moreover, it is not necessary to process the outlet face 35 of the first light introducing member 30 with high precision, such that the device 10 can be easily produced at a low cost.

(Other Embodiment)

In the first embodiment, the width w11, w12 of light 6 located at the position of the light receiving face 41 is larger than the width w10 of the inlet face 31. However, if the first distance D is set smaller than the second distance d10, the width w11, w12 may be set smaller than the width w10, because the width w11, w12 can be made larger than the size of the light receiving face 41 of the first light receiving element 40.

The first light introducing member 30 and the second light introducing member 70 may be integrated with each other as a single light introducing member. In this case, the route of light 6 is set not to cross the route of light 8 in the single light introducing member, and a portion of the single light introducing member corresponding to the second light introducing member 70 is colored. The number of components defining the device 10 can be reduced, when the first light introducing member 30 and the second light introducing member 70 are integrated into the single light introducing member.

The light emitting element 50 may emit light other than the infrared light. Further, the shielding portion may be made of other electronic component arranged on the substrate 11 other than the capacitor 90. Furthermore, the shielding portion may not be made of the electronic component.

Such changes and modifications are to be understood as being within the scope of the present invention as defined by the appended claims.

What is claimed is:

1. A light detecting device to detect light traveling around a vehicle comprising:
    a case having an opening to be mounted to a windshield of the vehicle, a predetermined light passing through the windshield and the opening;
    a first light introducing member located adjacent to the opening, the first light introducing member having
        an inlet face into which the predetermined light is incident, and
        an outlet face to emit the light incident into the inlet face; and
    a first light receiving element arranged in the case so as to receive the light emitted from the outlet face, wherein
    the first light receiving element outputs a signal corresponding to an intensity of the light received by the first light receiving element,
    the outlet face has a convex lens shape so as to define
        a first distance between a top point of the outlet face and a focus of the first light introducing member, and
        a second distance between the top point of the outlet face and a light receiving face of the first light receiving element, and
    the first distance is smaller than the second distance.

2. The light detecting device according to claim 1, wherein
    the inlet face has a first dimension in a predetermined direction,
    the light emitted from the outlet face has a second dimension in the predetermined direction when the light emitted from the outlet face reaches the light receiving face, and
    the second dimension is larger than the first dimension.

3. The light detecting device according to claim 1, further comprising:
    a raindrop detector to detect an amount of raindrop adhering on an outer face of the windshield, the raindrop detector including
        a light emitting element to emit light toward the windshield, and
        a second light receiving element to receive light reflected by a border plane defined between the outer face of the windshield and an outside of the vehicle, the second light receiving element outputting a signal corresponding to an intensity of the light received by the second light receiving element; and
    a second light introducing member located between the raindrop detector and the windshield, wherein
    the light emitted from the light emitting element passes through the second light introducing member, and is reflected by the border plane, and
    the light passing through the first light introducing member has a route unable to cross a route of the light passing through the second light introducing member in the first light introducing member or the second light introducing member.

4. The light detecting device according to claim 3, wherein
    the first light introducing member and the second light introducing member are separated from each other.

5. The light detecting device according to claim 3, wherein
    the second light introducing member is located between the first light receiving element and the windshield, and
    the second light introducing member has a color able to shield light having a wave length in a predetermined range.

6. The light detecting device according to claim 3, further comprising:
    a shielding portion to shield the light emitted from the outlet face, wherein
    the first light receiving element is located between the light emitting element and the second light receiving element, and
    the shielding portion is located between the first light receiving element and the second light receiving element.

7. The light detecting device according to claim 6, further comprising:
- a substrate on which the first light receiving element, the light emitting element and the second light receiving element are arranged; and
- at least one electronic component arranged on the substrate, wherein
- the shielding portion is made of the electronic component.

8. A light detecting device to detect light traveling around a vehicle comprising:
- a case having an opening to be mounted to a windshield of the vehicle, a predetermined light passing through the windshield and the opening;
- a first light introducing member located adjacent the opening, the first light introducing member having
  - an inlet face into which the predetermined light is incident, and
  - an outlet face to emit the light incident into the inlet face; and
- a first light receiving element arranged in the case so as to receive the light emitted from the outlet face, wherein
- the first light receiving element outputs a signal corresponding to an intensity of the light received by the first light receiving element,
- the inlet face has a first dimension in a predetermined direction,
- the light emitted from the outlet face has a second dimension in the predetermined direction when the light emitted from the outlet face reaches a light receiving face of the first light receiving element, and
- the outlet face has a concave lens shape in a manner that the second dimension is larger than the first dimension.

9. The light detecting device according to claim 8, further comprising:
- a raindrop detector to detect an amount of raindrop adhering on an outer face of the windshield, the raindrop detector including
  - a light emitting element to emit light toward the windshield, and
  - a second light receiving element to receive light reflected by a border plane defined between the outer face of the windshield and an outside of the vehicle, the second light receiving element outputting a signal corresponding to an intensity of the light received by the second light receiving element; and
- a second light introducing member located between the raindrop detector and the windshield, wherein
- the light emitted from the light emitting element passes through the second light introducing member, and is reflected by the border plane, and
- the light passing through the first light introducing member has a route unable to cross a route of the light passing through the second light introducing member in the first light introducing member or the second light introducing member.

10. The light detecting device according to claim 9, wherein
the first light introducing member and the second light introducing member are separated from each other.

11. The light detecting device according to claim 9, wherein
- the second light introducing member is located between the first light receiving element and the windshield, and
- the second light introducing member has a color able to shield light having a wave length in a predetermined range.

12. The light detecting device according to claim 9, further comprising:
- a shielding portion to shield the light emitted from the outlet face, wherein
- the first light receiving element is located between the light emitting element and the second light receiving element, and
- the shielding portion is located between the first light receiving element and the second light receiving element.

13. The light detecting device according to claim 12, further comprising:
- a substrate on which the first light receiving element, the light emitting element and the second light receiving element are arranged; and
- at least one electronic component arranged on the substrate, wherein
- the shielding portion is made of the electronic component.

* * * * *